July 28, 1959     A. CIROT     2,897,349

STAND LAMP

Filed Feb. 24, 1956

United States Patent Office 2,897,349
Patented July 28, 1959

2,897,349

STAND LAMP

André Cirot, Paris, France

Application February 24, 1956, Serial No. 567,579

Claims priority, application France March 2, 1955

2 Claims. (Cl. 240—81)

A large number of industrial and commercial premises are such that they require the use throughout the day of artifical light. Now, the protracted use of artificial light strains the eyesight of the persons subjected to it and it has been consequently attempted to remove this serious drawback by providing colored lamps which modify the intensity of certain radiations and provide a rest for the eye. It has been found from this standpoint that the human eye is unequally well adapted for the reception of the different colors of the spectrum and that consequently it is preferable to select the color which is the best suitable for the eye of a given person. Under such conditions, it has already been proposed to design an apparatus producing rays of a number of colors so as to allow selecting as desired the most suitable color.

My invention has for its object an electric illuminating device intended more particularly for individual illumination, said device incorporating a source of light associated with a reflecting surface at least a section of which is constituted by a surface producing colored reflecting rays. According to a primary feature of my invention, said surface producing colored reflected rays in incorporated with a system of movable surfaces reflecting the incoming rays in different colors and serving selectively as portions of the complete reflecting surface of the illuminating means. It is thus possible to superpose over the direct radiating rays and/or over the rays reflected by the stationary surfaces, if any, reflected rays the color of which may be selected by the operator in accordance with his own eye sensitivity so as to obtain a corrected illumination.

The surfaces producing colored reflecting rays are preferably constituted by reflecting plates associated with transparent plates of different colors forming screens and adapted to modify the color of the light beam produced by the illuminating source. The reflecting plates may be executed in any desired manner with plane, concave, convex or corrugated surfaces constituted by polished and silvered metal plates or else by metallic deposits on a suitable support. Said reflecting plates are arranged in superposed relationship with plates made of colored glass or the like transparent material.

The selection of color of the reflected rays may be obtained in various manners. Thus, it is possible to provide a single reflecting surface and a plurality of colored screens adapted to be superposed selectively through any mechanical means over said reflecting surface with a view to modifying the color of the rays reflected by the latter. However, it is preferable to associate with each screen its own reflecting surface, the system of reflecting surfaces being assembled so as to form a prismatic body revolubly mounted round its axis and the different surfaces of which may be caused to face in succession the source of light so as to reflect at least a fraction of the rays projected by said source towards the surface which is being worked upon.

I will now describe my invention with further detail, reference being made to the accompanying drawings illustrating by way of example various embodiments of my invention. In said drawings.

Figure 1:
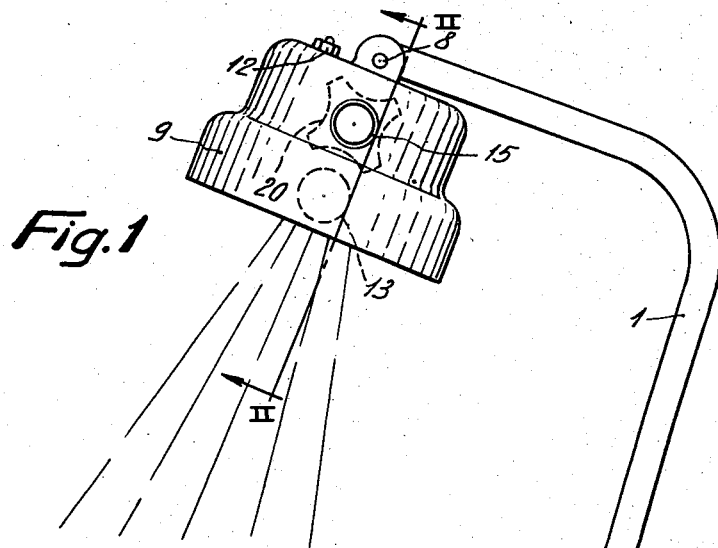
Fig. 1 is a lateral elevational view of the illuminating device according to my invention, the support of which is shown cross-sectionally.
Figure 2:
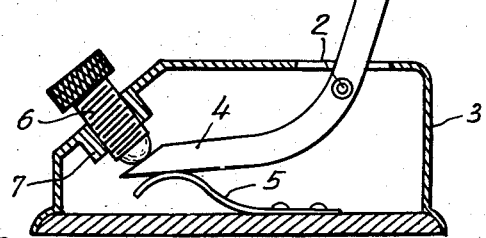
Fig. 2 is a view thereof on a larger scale through line II—II of Fig. 1.

As illustrated, the actual illuminating means are carried by a bracket 1 in the general shape of a C pivotally carried at 2 by the case 3 forming the support. The lower end 4 of the bracket 1 cooperates with a spring 5 urging it upwardly against an adjustable stop screw 6 threadedly engaging a threaded socket 7 rigid with the case; said stop screw 6 allows adjusting the angular setting of the bracket the lower end of which is held in position with reference to said screw by the spring 5 and consequently this arrangement allows adjusting the direction assumed by the luminous rays produced by the source of light carried at the upper end of said bracket.

To the upper end of the bracket is secured through a hinge 8 a metal cap 9 forming the light-shade of the illuminating means. Inside said cap is fitted a socket 10 fed through an electric wire 11 controlled by a switch 12. Said socket is adapted to receive an incandescent bulb 13 of a cylindrical type enclosing an elongated source of light extending along the longitudinal axis of a cap 9 the side walls of which are substantially rectangular.

Above the bulb 13, between the latter and the bottom of the cap 9 is fitted the reflector according to my invention. Said reflector includes a rod 14 the ends of which are threaded over part of their length and are revolubly mounted inside the side walls of the cap, said rod being parallel with the axis of the bulb 13. To each end of said rod and on the outside of the cap are secured control knobs 15 which are locked onto the corresponding ends of the rod. A spring 16 holds the reflector in any desired angular setting. Two metal flanges 17 are fitted over said rod 14 inwardly of the cap and are locked in a longitudinally adjusted position on the latter by nuts 18 cooperating with the threaded sections of said rod so as to hold said flanges in the desired position. These flanges are provided along their outer edges of their surfaces facing each other with grooves 19 serving as housings for the outer edges of the reflecting surfaces designated by the general reference number 20.

Figure 3:
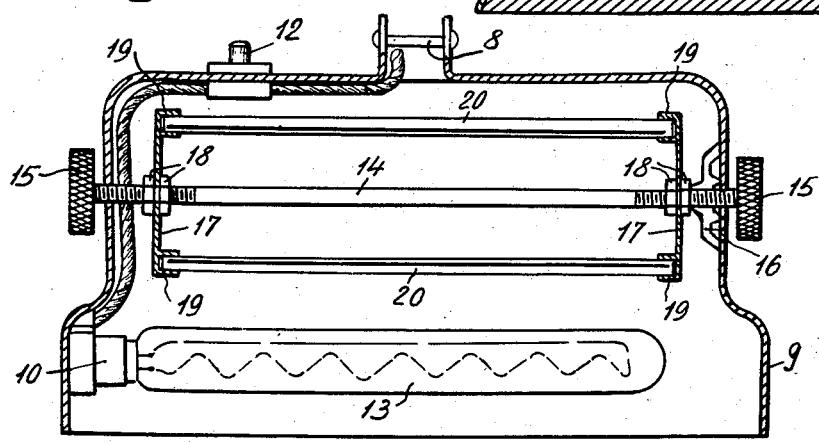
Fig. 3 is a diagrammatic cross-section of a first embodiment of the selective reflector according to my invention.
Figure 3:
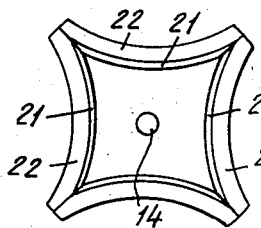
Figure 4:
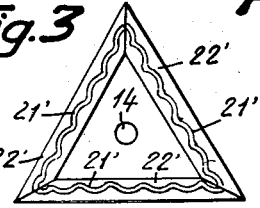
Fig. 4 is a diagrammatic cross-section of a second embodiment of such a selective reflector.

These reflecting surfaces may, as illustrated in Fig. 3, be four in number and may each comprise a cylindrical concave polished reflecting metal plate 21 over which is superposed a screen of colored glass 22. The four screens form four areas of different colors, say respectively, green, light yellow, a warm yellow and a whitish blue. In the embodiment illustrated in Fig. 4, each of the reflecting surfaces may comprise a corrugated surface 21' associated with a screen of colored glass 22'. In this second embodiment, there are only three reflecting surfaces.

It is apparent that the operator has merely to rotate the knobs 15 so as to modify the color of the reflecting rays and to correct thus the average shade of the light projected in accordance with the requirements of his own visual sensitivity.

What I claim is:

1. A stand lamp comprising a base member, a C-shaped bracket pivotally mounted on said base member, an adjustable stop-screw contacting the lower movable end of said bracket, a spring attached to the said base member and biasing the lower end of said bracket in an upward direction and urging said end of said bracket against said stop-screw, a shade pivotally mounted at the other end of the said bracket, an exposed electric lamp bulb mounted in said shade adjacent the open side of said shade for projecting light rays inwardly toward the inner surface of said shade as well as outwardly directly from said bulb through said open side, a reflector means of prismatic form extending crosswise within the shade behind the said bulb and rotatably mounted on said shade to selectively dispose any one of its surfaces towards said bulb, a differently colored reflecting element on each surface of said prismatic form for selectively reflecting colored light rays into the path of light rays projected directly from said bulb through the open side of said shade, and a handle for rotatably moving said reflector means.

2. A stand lamp comprising a base member, a standard extending upwardly from said base member, a shade mounted at the upper part of said standard and comprising an open side substantially facing said base member, an exposed electric lamp bulb mounted in said shade adjacent the open side of said shade for projecting light rays inwardly toward the inner surface of said shade as well as outwardly directly from said bulb through said open side, a reflector means of prismatic form extending crosswise within the shade behind the said bulb and rotatably mounted on said shade to selectively dispose any one of its surfaces towards said bulb, a differently colored reflecting element on each surface of said prismatic form for selectively reflecting colored light rays into the path of light rays projected directly from said bulb through the open side of said shade, and a handle for rotatably moving said reflector means.

References Cited in the file of this patent

UNITED STATES PATENTS

| | | |
|---|---|---|
| 2,041,412 | Homrighous | May 19, 1936 |
| 2,199,308 | Evans | Apr. 30, 1940 |
| 2,217,790 | Boynton | Oct. 15, 1940 |
| 2,220,215 | Cloutier | Nov. 5, 1940 |
| 2,534,921 | Lyman | Dec. 19, 1950 |
| 2,540,908 | Pinkerman | Feb. 6, 1951 |
| 2,583,055 | Kress et al. | Jan. 22, 1952 |